United States Patent
Sato

(10) Patent No.: US 9,281,771 B2
(45) Date of Patent: Mar. 8, 2016

(54) DRIVE CONTROLLER, IMAGE PICKUP APPARATUS, DRIVE CONTROL METHOD, AND STORAGE MEDIUM

(71) Applicant: CANON KABUSHIKI KAISHA, Tokyo (JP)

(72) Inventor: Koji Sato, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/279,770

(22) Filed: May 16, 2014

(65) Prior Publication Data

US 2014/0341554 A1 Nov. 20, 2014

(30) Foreign Application Priority Data

May 20, 2013 (JP) .................. 2013-105929

(51) Int. Cl.
   *G03B 3/10* (2006.01)
   *H02P 8/22* (2006.01)
   *H02P 8/32* (2006.01)
   *H02P 8/38* (2006.01)

(52) U.S. Cl.
   CPC .. *H02P 8/22* (2013.01); *G03B 3/10* (2013.01); *H02P 8/32* (2013.01); *H02P 8/38* (2013.01)

(58) Field of Classification Search
   CPC ........................................................ G03B 3/10
   USPC ........................................................ 396/133
   See application file for complete search history.

(56) References Cited

U.S. PATENT DOCUMENTS

| 6,046,567 | A  | * | 4/2000  | Hayes ........................... | 318/696 |
| 8,588,601 | B2 |   | 11/2013 | Honda                           |         |
| 2008/0100249 | A1 | * | 5/2008 | Coutu ........................... | 318/561 |
| 2011/0158626 | A1 | * | 6/2011 | Honda ........................... | 396/133 |
| 2013/0043822 | A1 | * | 2/2013 | Vu ................................ | 318/696 |

FOREIGN PATENT DOCUMENTS

| JP | 01-186198 A | 7/1989 |
| JP | 10-066393 A | 3/1998 |
| JP | 2005-210786 A | 8/2005 |
| JP | 2008-206352 A | 9/2008 |
| JP | 2011-135700 A | 7/2011 |
| JP | 2011-199924 A | 10/2011 |

* cited by examiner

*Primary Examiner* — Clayton E LaBalle
*Assistant Examiner* — Dennis Hancock
(74) *Attorney, Agent, or Firm* — Rossi, Kimms & McDowell LLP

(57) ABSTRACT

A drive controller includes a stepping motor capable of performing micro-step drive of a predetermined number of divisions by using an excitation current having a sine waveform, and a control unit configured to calculate a first drive pulse of the stepping motor to perform the micro-step drive, and the control unit is configured to change the first drive pulse to a second drive pulse depending on a ratio of a step phase of a predetermined phase region included in a range of the micro-step drive when performing the micro-step drive with the first drive pulse in a wobbling operation.

18 Claims, 8 Drawing Sheets

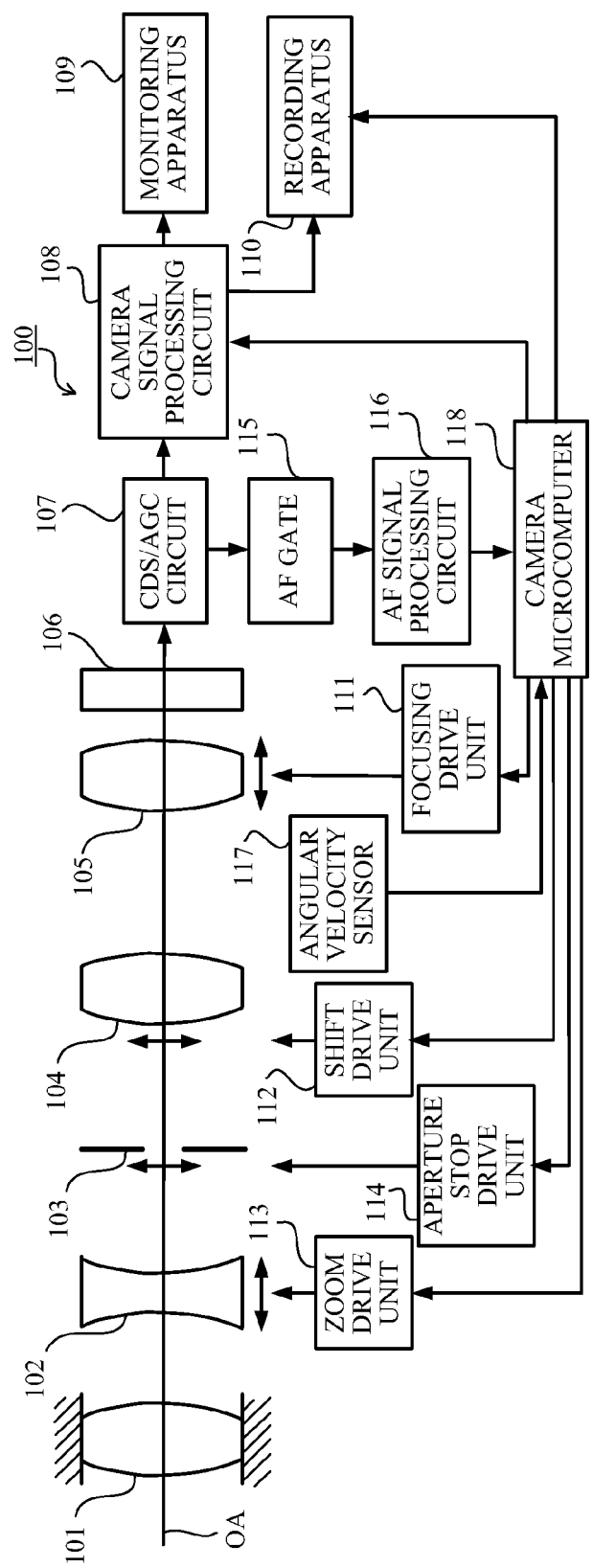
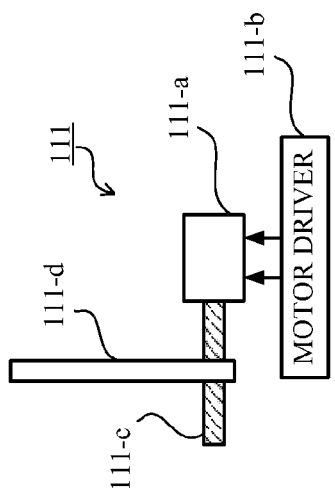
FIG. 2A
FIG. 2B

DRIVE CONTROLLER, IMAGE PICKUP APPARATUS, DRIVE CONTROL METHOD, AND STORAGE MEDIUM

BACKGROUND OF THE INVENTION

1. Field of the Invention

The present invention relates to a drive controller that performs micro-step drive of a stepping motor.

2. Description of the Related Art

Conventionally, a stepping motor has been widely used to drive a focus lens in an automatic focus control (AF control) by a TV-AF method in an image pickup apparatus. The AF control by the TV-AF method detects the position of the focus lens at which an AF evaluation value is maximized, by performing a repetitive operation of micro movement (a wobbling operation) in both telephoto side and wide-angle side directions of the focus lens. A micro-step drive method is widely adopted as a method of driving the stepping motor for the AF control by the TV-AF method. The micro-step drive method employs an excitation current having a sine waveform to achieve drive with a step (micro step) finer than one step (the minimum rotation angle) of the stepping motor.

In the micro-step drive method, however, the rotation angle of the micro step fluctuates with the phase (step phase) of the excitation current. This is because deviation (cogging) of the magnetic flux distribution of a permanent magnet that is a rotor of the stepping motor causes pulsation of a magnetic attracting force. Fluctuation in the rotation angle due to the cogging at each step phase is a factor causing fluctuation in the moving amplitude of the focus lens in the wobbling operation.

When a wobbling width (the number of micro steps) is determined based on the step phase having a small rotation angle, the amount of movement of the focus lens exceeds the depth of field in some cases in the step phase having a large rotation angle during the wobbling operation, which results in focusing fluctuation. On the other hand, when the wobbling width is determined based on the step phase having a large rotation angle, kinetic energy required for the micro movement of the focus lens cannot be obtained in the step phase having a small rotation angle during the wobbling operation, which potentially causes what is called a step-out.

Japanese Patent Laid-open No. 2011-135700 discloses a drive control method for keeping substantially constant the drive amount of the wobbling operation by controlling the rotation angle to be small when driving through a first phase having a small rotation angle of the stepping motor before and after a second phase having a large rotation angle.

The drive control method disclosed in Japanese Patent Laid-open No. 2011-135700 is effective in the wobbling operation in which the rotation angle is allowed to be large to a certain extent. The effect due to the cogging is, however, unavoidable when a markedly small amount of the wobbling operation is performed to drive only in a region having a large cogging. It is also impossible to controllably change the wobbling amplitude to an appropriate amplitude

SUMMARY OF THE INVENTION

The present invention provides a drive controller, an image pickup apparatus, a drive control method, and a storage medium that reduce adverse effects attributable to fluctuation in the rotation angle of the micro step of the stepping motor according to the step phase.

A drive controller as one aspect of the present invention includes a stepping motor capable of performing micro-step drive of a predetermined number of divisions by using an excitation current having a sine waveform, and a control unit configured to calculate a first drive pulse of the stepping motor to perform the micro-step drive, and the control unit is configured to change the first drive pulse to a second drive pulse depending on a ratio of a step phase of a predetermined phase region included in a range of the micro-step drive when performing the micro-step drive with the first drive pulse in a wobbling operation.

A drive controller as another aspect of the present invention includes a stepping motor capable of performing micro-step drive of a predetermined number of divisions by using an excitation current having a sine waveform, and a control unit configured to calculate a first drive velocity of the stepping motor to perform the micro-step drive, and the control unit is configured to change the first drive velocity to a second drive velocity depending on a step phase of the excitation current.

An image pickup apparatus as another aspect of the present invention includes a lens, a drive controller, and a focus control unit configured to perform automatic focus by moving the lens by the drive controller.

A drive control method as another aspect of the present invention is a method of performing a drive control of a stepping motor capable of performing micro-step drive of a predetermined number of divisions by using an excitation current having a sine waveform, and includes the steps of calculating a first drive amount of the stepping motor to perform the micro-step drive, determining whether a step phase of a predetermined phase region is included when performing the micro-step drive with the first drive amount, and changing the first drive amount to a second drive amount when the step phase of the predetermined phase region is included.

A drive control method as another aspect of the present invention is a method of performing a drive control of a stepping motor capable of performing micro-step drive of a predetermined number of divisions by using an excitation current having a sine waveform, and includes the steps of calculating a first drive velocity of the stepping motor to perform the micro-step drive, determining whether a step phase of a predetermined phase region is included when performing the micro-step drive at the first drive velocity, and changing the first drive velocity to a second drive velocity when the step phase of the predetermined phase region is included.

A non-transitory computer-readable storage medium as another aspect of the present invention stores a computer program configured to cause a computer to execute a drive control of a stepping motor capable of performing micro-step drive of a predetermined number of divisions by using an excitation current having a sine waveform, and the computer program causes the computer to execute the steps of calculating a first drive amount of the stepping motor to perform the micro-step drive, determining whether a step phase of a predetermined phase region is included when performing the micro-step drive with the first drive amount, and changing the first drive amount to a second drive amount when the step phase of the predetermined phase region is included.

A non-transitory computer-readable storage medium as another aspect of the present invention stores a program configured to cause a computer to execute a process of a drive control of a stepping motor capable of performing micro-step drive of a predetermined number of divisions by using an excitation current having a sine waveform, and the process includes calculating a first drive velocity of the stepping motor to perform the micro-step drive, determining whether a step phase of a predetermined phase region is included when performing the micro-step drive with the first drive velocity, and changing the first drive velocity to a second drive velocity when the step phase of the predetermined phase region is included.

A non-transitory computer-readable storage medium as another aspect of the present invention stores a program configured to cause a computer to execute a process of a drive control of a stepping motor capable of performing micro-step drive of a predetermined number of divisions by using an excitation current having a sine waveform, and the process includes calculating a first drive velocity of the stepping motor to perform the micro-step drive, determining whether a step phase of a predetermined phase region is included when performing the micro-step drive with the first drive velocity, and changing the first drive velocity to a second drive velocity when the step phase of the predetermined phase region is included.

Further features and aspects of the present invention will become apparent from the following description of exemplary embodiments with reference to the attached drawings.

BRIEF DESCRIPTION OF THE DRAWINGS

FIG. 2A is a block diagram of an image pickup apparatus in the first embodiment.

FIG. 2B is a configuration diagram of a focusing drive unit in the first embodiment.

DESCRIPTION OF THE EMBODIMENTS

Figure 1:
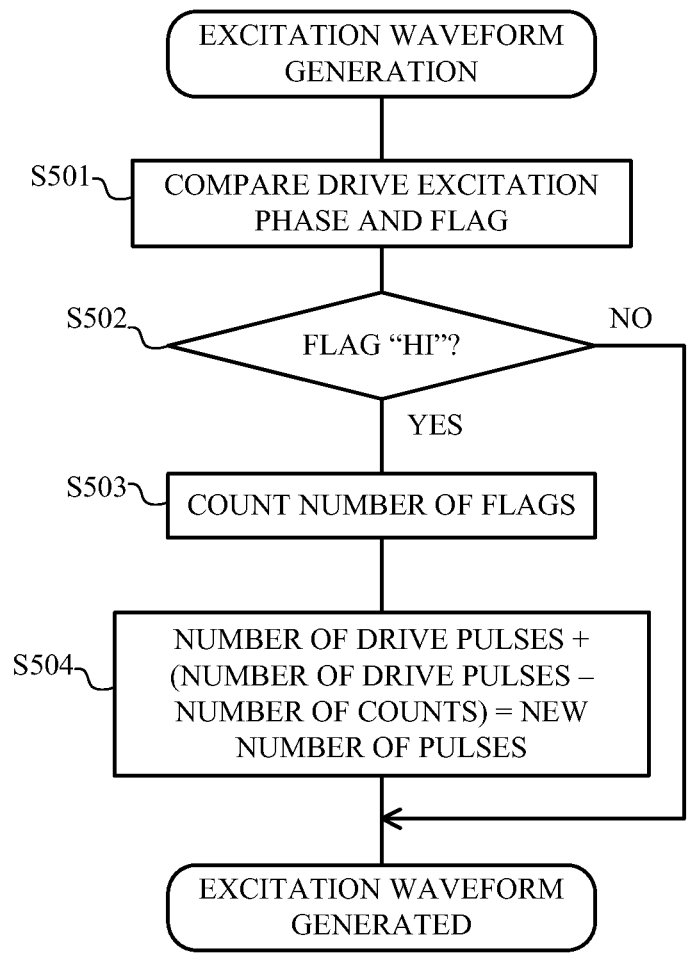
FIG. 1 is a flowchart of excitation waveform generation processing in a first embodiment.

Exemplary embodiments of the present invention will be described below with reference to the accompanied drawings. In each of the drawings, the same elements will be denoted by the same reference numerals and the duplicate descriptions thereof will be omitted.

[First Embodiment]

First, referring to FIG. 2A and FIG. 2B, the configuration of an image pickup apparatus in a first embodiment of the present invention will be described. FIG. 2A is a block diagram illustrating an image pickup apparatus 100 in the present embodiment. FIG. 2B is a configuration diagram of a focusing drive unit 111 of the image pickup apparatus 100.

In FIG. 2A, an image pickup optical system (lens) of the image pickup apparatus 100 includes a fixed lens 101, a zoom lens 102 that moves in a direction of an optical axis OA (optical axis direction) to perform zooming, and an aperture stop 103. The image pickup optical system includes a shift lens 104 that moves in a direction orthogonal to the optical axis OA to deflect the optical axis OA, thereby compensating the movement of an image due to a hand shake. The image pickup apparatus 100 includes an angular velocity sensor 117 serving as a hand shake detection unit. The image pickup optical system includes a focus lens 105 (focus compensator lens) having a function of correcting the movement of a focal plane in zooming and a function of focusing.

In the present embodiment, the image pickup optical system is integrated with the image pickup apparatus 100 (image pickup apparatus body), but the image pickup optical system may be configured to be detachable from the image pickup apparatus body. In this configuration, a control signal generated by a camera microcomputer 118 (control unit) described later is communicated to a lens microcomputer of the image pickup optical system, and is used to control the drive of the focus lens 105 via the lens microcomputer.

The image pickup apparatus 100 includes an image pickup element 106 (photoelectric conversion element) including a CCD sensor, a CMOS sensor, or the like, and a CDS/AGC circuit 107 that performs gain adjustment by sampling the output of the image pickup element 106. A camera signal processing circuit 108 performs various kinds of image processing on an output signal from the CDS/AGC circuit 107 to generate an image signal. A monitoring apparatus 109 includes an LCD for example and displays the image signal from the camera signal processing circuit 108. A recording apparatus 110 records the image signal from the camera signal processing circuit 108 in a recording medium such as a semiconductor memory.

The focusing drive unit 111, a shift drive unit 112, a zoom drive unit 113, and an aperture stop drive unit 114 drive the focus lens 105, a shift lens 104, a zoom lens 102, and an aperture stop 103 respectively based on a command (an instruction) from the camera microcomputer 118. The camera microcomputer 118 is a control unit that controls each unit. As illustrated in FIG. 2B, the focusing drive unit 111 includes a stepping motor 111-a, a motor driver 111-b, and a screw shaft 111-c (feed screw). The screw shaft 111-c engages with a rack 111-d provided to the focus lens 105. The power of the stepping motor 111-a (energy generated by drive) is transferred as power to move the focus lens 105 via the screw shaft 111-c and the rack 111-d engaged with it (these integrally function as a transmission mechanism). The other drive units are configured similarly to the focusing drive unit 111.

An AF gate 115 allows only signals of a region used for focus detection to pass through among the output signals of all pixels from the CDS/AGC circuit 107. An AF signal processing circuit 116 extracts a high frequency component, a luminance difference component (the difference between the maximum and minimum values of the luminance level of the signal passing through the AF gate 115), and the like from the signals passing through the AF gate 115, to generate an AF evaluation value signal. The AF evaluation value signal represents the sharpness (contrast state) of an image generated based on the output signal from the image pickup element 106. The sharpness varies with the in-focus state of the image pickup optical system. This means that the AF evaluation value signal is a signal representing the in-focus state of the image pickup optical system. The camera microcomputer 118 controls the movements of the zoom lens 102, the shift lens 104, and the focus lens 105, and the opening and closing of the aperture stop 103.

Subsequently, a method of performing a drive control of the stepping motor in the present embodiment will be described with an example of an automatic focus control performed by the camera microcomputer 118 and the focusing drive unit 111 (a focus control unit). In the present embodiment, a focus control (TV-AF) by the TV-AF method is adopted as the automatic focus control performed while moving the focus lens 105. In the TV-AF method, the camera microcomputer 118 and the focusing drive unit 111 can focus on an object by moving the focus lens 105 to maximize an AF evaluation value while wobbling the focus lens 105.

Figure 3:
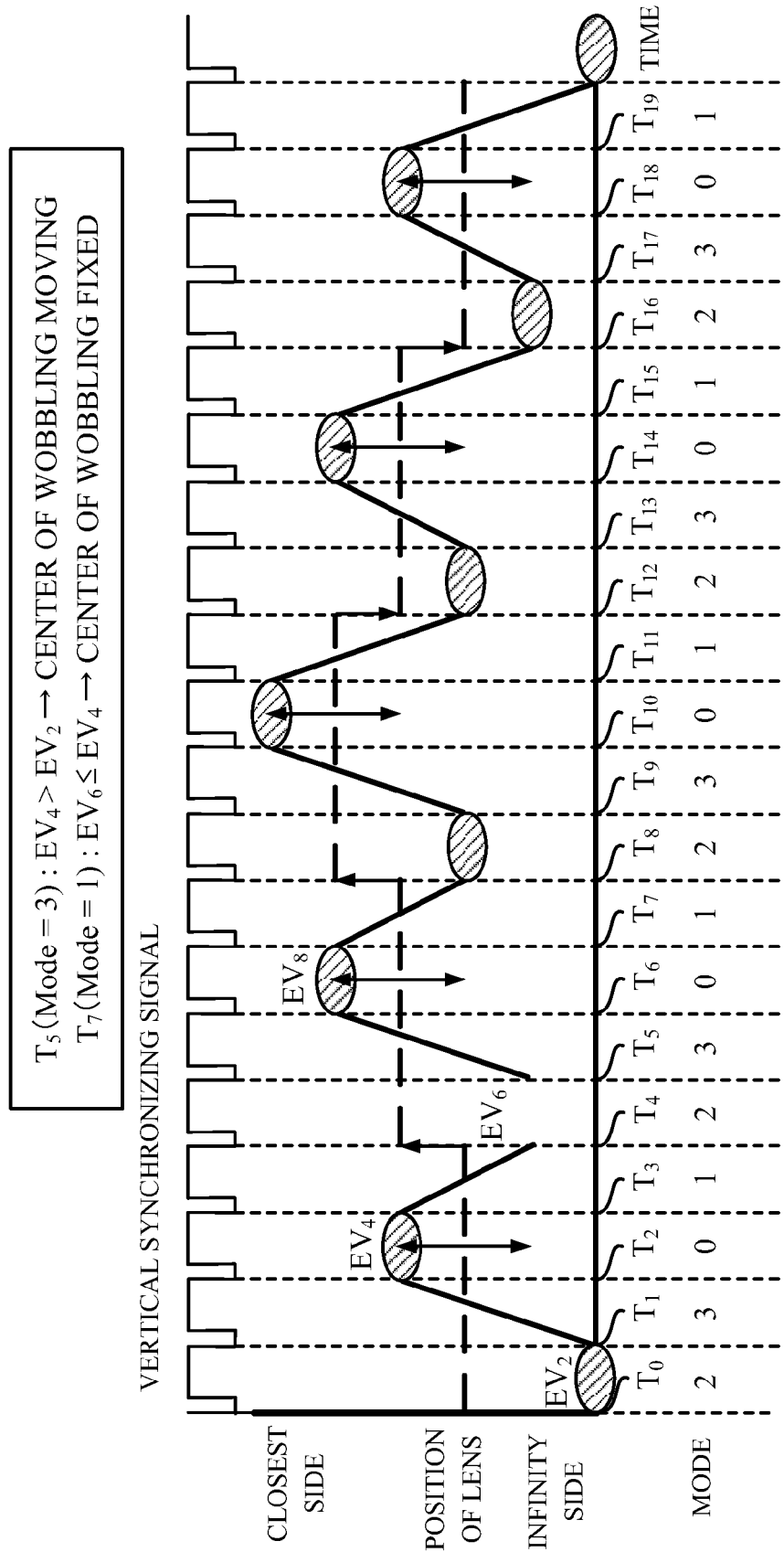
FIG. 3 is a conceptual diagram of a TV-AF in the first embodiment.

FIG. 3 is a conceptual diagram of the TV-AF. In FIG. 3, the horizontal axis represents time, in which a vertical synchronizing signal of the image pickup element 106 specifies a unit of time. The vertical axis represents a position (lens position) of the focus lens 105. Modes (=0 to 3) represent the phase of processing during execution of the TV-AF. Specifically, the modes represent the following.

In the case of Mode=0, the AF evaluation value (infinity-side AF evaluation value) is acquired based on electric charges accumulated in the image pickup element 106 in previous processing with Mode=2 (during which the focus lens 105 is located on the infinity side in wobbling). In the case of Mode=1, the focus lens 105 moves from the closest side toward the infinity side in wobbling. At the same time, the center of wobbling moves toward the infinity side in some cases. In the case of Mode=2, the AF evaluation value (closest-side AF evaluation value) is acquired based on electric charges accumulated in the image pickup element 106 in previous processing with Mode=0 (during which the focus lens 105 is located on the closest side in wobbling). In the case of Mode=3, the focus lens 105 moves from the infinity side toward the closest side in wobbling. At the same time, the center of wobbling moves toward the closest side in some cases.

In the example in FIG. 3, the electric charge accumulated in the image pickup element 106 between time T0 and time T1 (Mode=2) is read out at time T2, whereby an infinity side AF evaluation value EV2 is acquired. The electric charge accumulated in the image pickup element 106 between time T2 and time T3 (Mode=0) is read out at time T4, whereby a closest-side AF evaluation value EV4 is acquired. The in-focus position is potentially even closer to the closest side because the relation EV4>EV2 is satisfied. For this reason, between time T5 and time T6 (Mode=3), the focus lens 105 moves from the infinity side toward the closest side as a normal wobbling operation, and moves even closer to the closest side to move the center of wobbling to the closest side.

Subsequently, the electric charge accumulated in the image pickup element 106 between time T4 and time T5 (Mode=2) is read out at time T6, whereby an infinity side AF evaluation value EV6 is acquired. The in-focus position is not expected to be even closer to the infinity side because the relation EV6≤EV4 is satisfied. For this reason, between time T7 and time T8 (Mode=1), the focus lens 105 moves from the closest side toward the infinity side as a normal wobbling operation, but the center of wobbling does not move. Such an operation is repeated to detect the position of the focus lens 105 at which the AF evaluation value reaches a peak.

Figure 4:
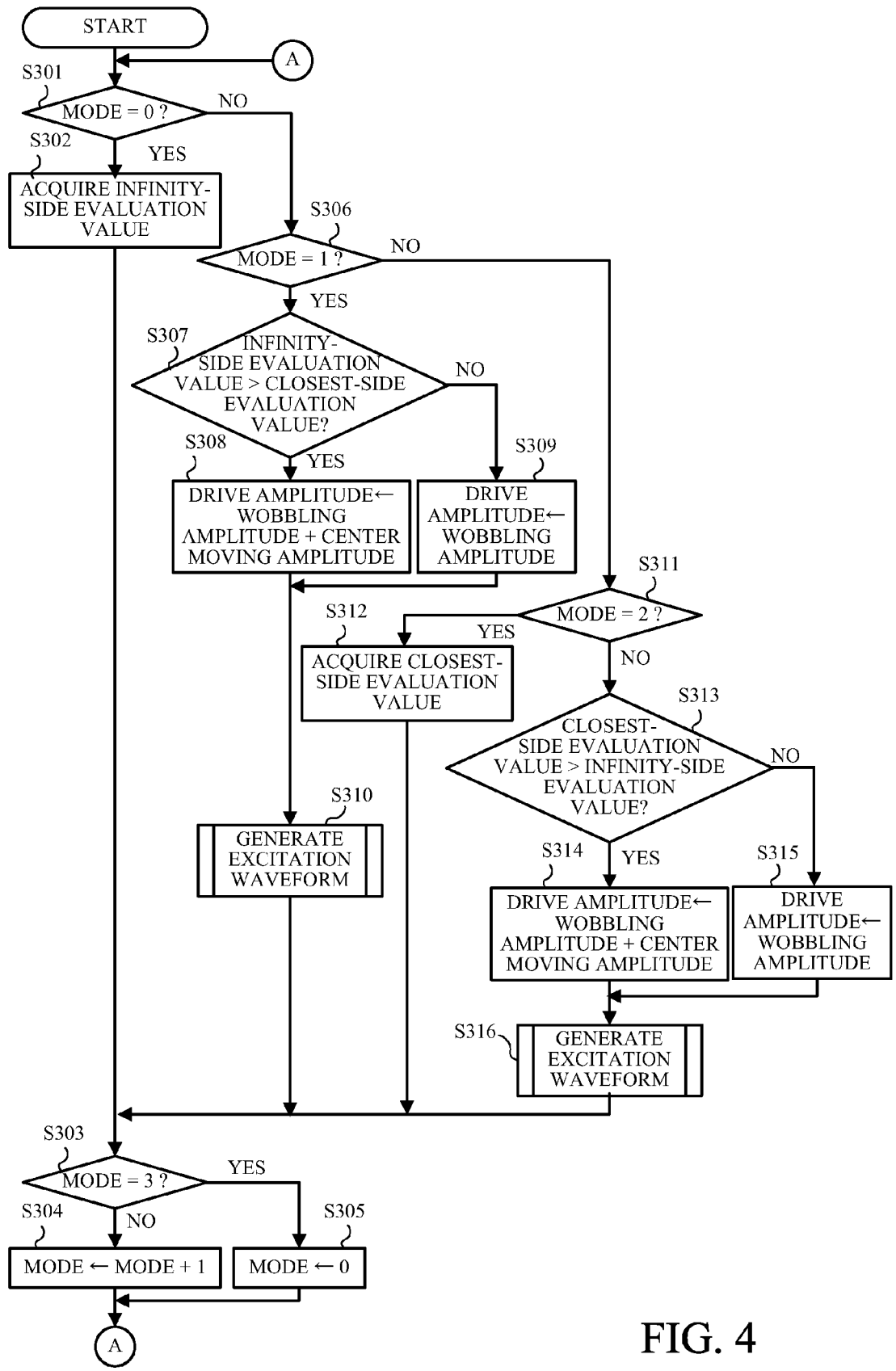
FIG. 4 is a flowchart illustrating the TV-AF in the first embodiment.

FIG. 4 is a flowchart of the TV-AF in the present embodiment. The steps in FIG. 4 are each performed by execution of a program (AF control program) by the camera microcomputer 118. The processing in each of the modes (refer to FIG. 3) starts in synchronization with the vertical synchronizing signal.

First, at step S301, the camera microcomputer 118 determines whether the current mode is 0. When the current mode is 0, the flow proceeds to step S302. On the other hand, when the current mode is not 0, the flow proceeds to step S306. At step S302, the camera microcomputer 118 acquires an infinity-side AF evaluation value (infinity-side evaluation value). This AF evaluation value is based on electric charges stored in the image pickup element 106 in previous processing with Mode=2 (during which the focus lens 105 is located on the infinity side in wobbling).

Subsequently, at step S303, the camera microcomputer 118 determines whether the mode is 3. When the mode is not 3, the flow proceeds to step S304 and adds 1 (one) to the value of the current mode. On the other hand, when the mode is 3, the flow proceeds to step S305 and the mode is set to 0. After the processing at step S304 or the processing at 5305 finishes, the flow returns to step S301. As described above, at steps S304 and S305, the camera microcomputer 118 periodically changes the mode in a sequence of 0, 1, 2, 3, 0, 1, 2, . . . .

When the current mode is not 0 at step S301, the flow proceeds to step S306. At step S306, the camera microcomputer 118 determines whether the current mode is 1. When the current mode is 1, the flow proceeds to step S307. On the other hand, when the current mode is not 1, the flow proceeds to step S311.

At step S307, the camera microcomputer 118 determines whether the infinity-side evaluation value acquired at step S302 is greater than a closest-side evaluation value (closest-side AF evaluation value) acquired in previous processing with Mode=2 (at step S312 described later). When the infinity-side evaluation value is greater than the closest-side evaluation value, the flow proceeds to step S308. On the other hand, when the infinity-side evaluation value is equal to or less than the closest-side evaluation value, the flow proceeds to step S309. When the closest-side evaluation value has yet to be acquired at the determination at step S307, the flow also proceeds to step S309.

At step S308, the camera microcomputer 118 sets the sum of a wobbling amplitude and a center moving amplitude as a drive amplitude (a first drive pulse or a first number of drive pulses, as a first drive amount). That is, the camera microcomputer 118 increases the amount of movement of the focus lens 105 toward the infinity side to move the center of wobbling toward the infinity side. The "wobbling amplitude" and the "center moving amplitude" may be previously set to constant values (fixed values). On the other hand, at step S309, the camera microcomputer 118 sets the wobbling amplitude as the drive amplitude (the first drive pulse or the first number of drive pulses). The drive amplitude corresponds to the number of drive micro steps. Subsequently, at step S310, the camera microcomputer 118 controls the motor driver 111-*b* of the focusing drive unit 111 to generate the excitation waveform for performing wobbling. After the camera microcomputer 118 generates the excitation waveform, the flow proceeds to step S303.

When the current mode is not 1 at step S306, the flow proceeds to step S311 and the camera microcomputer 118 determines whether the current mode is 2. When the current mode is 2, the flow proceeds to step S312. On the other hand, when the current mode is not 2, the flow proceeds to step S313. At step S312, the camera microcomputer 118 acquires the closest-side AF evaluation value (closest-side evaluation value). This AF evaluation value is based on electric charges accumulated in the image pickup element 106 in previous processing with Mode=0 (during which the focus lens 105 is located on the closest side in wobbling). After the camera microcomputer 118 acquires the closest-side AF evaluation value, the flow proceeds to step S303.

When the current mode is not 2 at step S311, the flow proceeds to step S313. At step S313, the camera microcomputer 118 determines whether the closest-side evaluation value acquired at step S312 is greater than the infinity-side evaluation value acquired in the previous processing with Mode=0 (at step S302). When the closest-side evaluation value is greater than the infinity-side evaluation value, the flow proceeds to step S314. On the other hand, when the closest-side evaluation value is equal to or less than the infinity-side evaluation value, the flow proceeds to step S315.

At step S314, the camera microcomputer 118 sets the sum of the wobbling amplitude and the center moving amplitude as the drive amplitude (the first drive pulse or the first number of drive pulses, as a first drive amount). That is, the camera microcomputer 118 increases the amount of movement of the focus lens 105 toward the closest side to move the center of wobbling toward the closest side. On the other hand, at step S315, the camera microcomputer 118 sets the wobbling amplitude as the drive amplitude (the first drive pulse or the first number of drive pulses). Subsequently, at step S316, the camera microcomputer 118 controls the motor driver 111-b of the focusing drive unit 111 to generate the excitation waveform for performing wobbling. The details of this processing will be described later with reference to FIG. 1. After the camera microcomputer 118 generates the excitation waveform, the flow proceeds to step S303.

Next, referring to FIG. 5A to FIG. 5D, the excitation waveform generation processing performed at steps S310 and S316 in FIG. 4 will be described. FIG. 5A to FIG. 5D are each a diagram illustrating the state of the stepping motor 111-a, and illustrates that the rotation angle of each of the micro steps of the stepping motor 111-a fluctuates with the step phase.

Excitation of the stepping motor 111-a is performed in two phases of phase A and phase B that are different from each other. The excitation current (excitation waveform) of each of the phases has a sine waveform, and the phase difference between phase A and phase B is 90 degrees where one period is expressed in 360 degrees. Finely varying the phase (step phase) of the excitation current allows micro-step drive with one step of the stepping motor 111-a divided into a predetermined number of steps (the micro-step drive with a predetermined number of divisions).

Figure 5A:
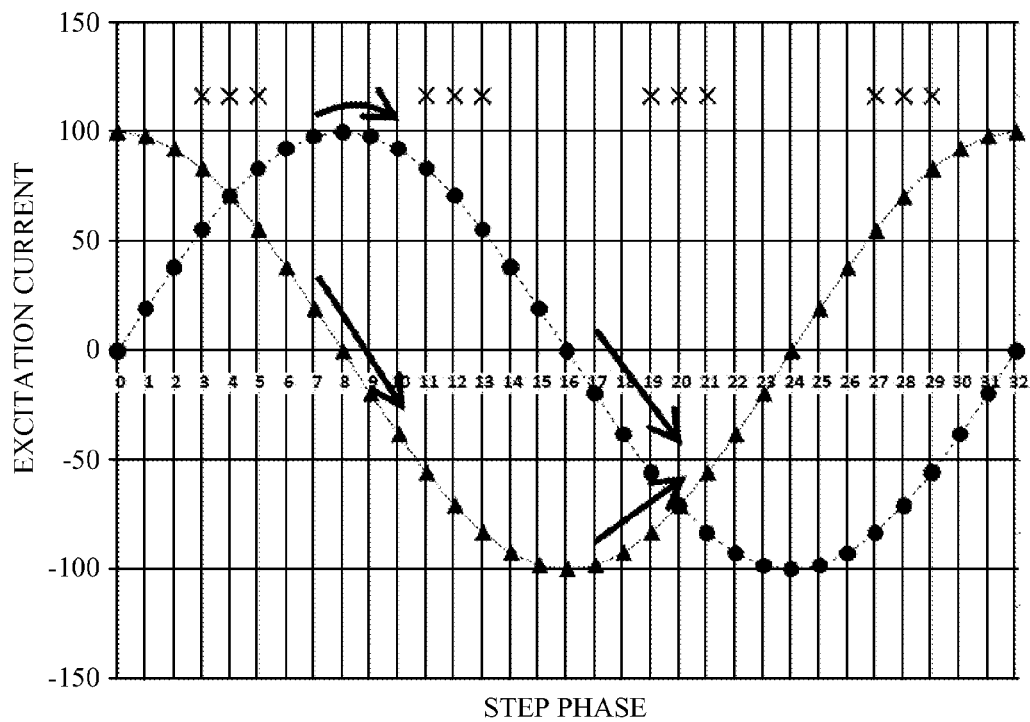
FIG. 5A is a diagram illustrating a drive control of a stepping motor in the first embodiment.

In FIG. 5A, the horizontal axis represents the step phase (excitation angle), and the vertical axis represents the excitation current. FIG. 5A illustrates that one period is divided into 32 steps, the case of driving in three steps (with three step widths) from step phase 7 in the closest-side direction, and the case of driving in three steps (with three step widths) from step phase 17 in the closest-side direction.

Figure 5B:
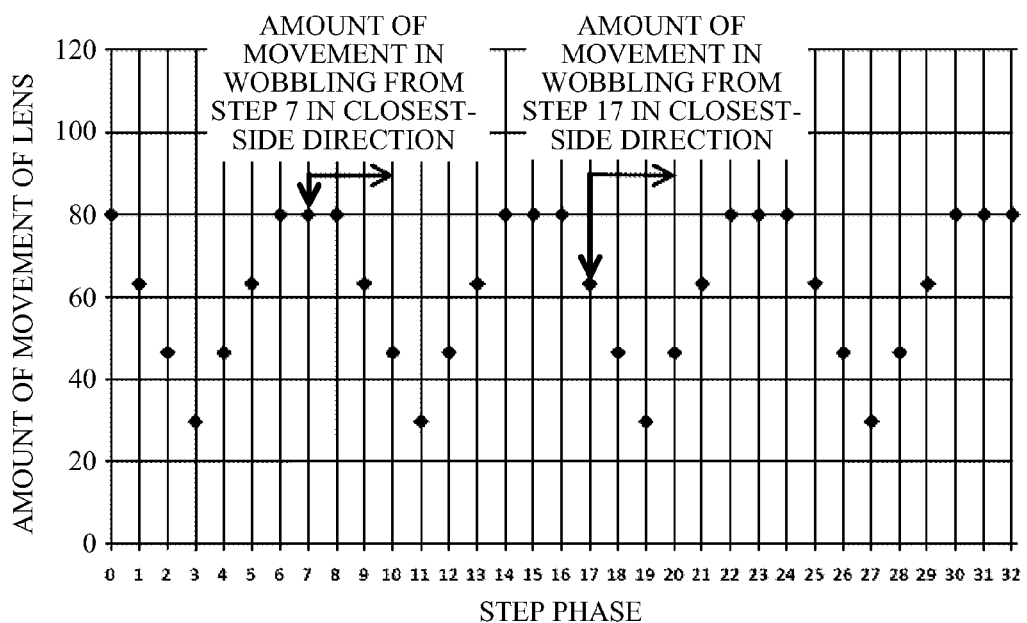
FIG. 5B is a diagram illustrating the drive control of the stepping motor in the first embodiment.

FIG. 5B illustrates the range of movement of the lens in the wobbling operation in each of the cases, that is, the range of movement of the focus lens 105 (the amount of movement of the lens) in the closest-side direction when the wobbling operation of the stepping motor 111-a is performed with an amplitude of three steps from each of the step phase. In FIG. 5B, the horizontal axis represents the step phase (the excitation angle), and the vertical axis represents the range of movement of the focus lens 105 (the amount of movement of the lens) in percentage with an ideal range of movement taken to be 100%.

In FIG. 5B, the range of movement of the focus lens 105 does not reach 100% because of loss in momentum caused through the transmission mechanism (the screw shaft 111-c and the rack 111-d) and fluctuation in the rotation angle of the stepping motor 111-a. As understood from FIG. 5A and FIG. 5B, the range of movement of the focus lens 105 (the amount of movement of the lens) markedly differs between the case of performing the three step drive from step phase 7 in the closest-side direction and the case of performing the three step drive from step phase 17 in the closest-side direction. Specifically, the amount of movement of the lens is substantially in a range of 45 to 80% in the case of performing the three step drive from step phase 7 in the closest-side direction, whereas the amount of movement of the lens is substantially in a range of 25 to 45% in the case of performing the three step drive from step phase 17 in the closest-side direction. As described above, this is caused by the cogging of the stepping motor 111-a. This fluctuation (that is, fluctuation in the rotation angle) is known to be generated every ¼ period of the excitation waveform.

As illustrated in FIG. 5A, at step phases 0, 8, 16, and 24 (0 degrees, 90 degrees, 180 degrees, and 270 degrees, respectively), only one phase is excited. This causes a small deviation in the magnetic flux distribution exerted on the rotor, which leads to a larger rotation angle. On the other hand, both phases (two phases of phases A and B) are strongly excited in the vicinity of step phases 4, 12, 20, and 28 (45 degrees, 135 degrees, 225 degrees, and 315 degrees, respectively). This causes a large deviation in the magnetic flux distribution exerted on the rotor, which leads to a smaller rotation angle.

Detailed analysis of FIG. 5B shows that the amount of movement of the lens is small in the wobbling operation in phase regions (second phase region) in the vicinity of step phases 4, 12, 20, and 28. On the other hand, the amount of movement of the lens is large in the wobbling operation in phase regions (first phase region) in the vicinity of step phases 0, 8, 16, and 24. The second phase region (predetermined phase region) where the amount of movement of the lens is small in the wobbling operation is previously set, and the set second phase region (the predetermined phase region) is stored in the camera microcomputer 118 (the storage unit). The second phase region is, for example, set to include the step phases (step phases 3 to 5, 11 to 13, 19 to 21, and 27 to 29) indicated by flags (symbol "x") in FIG. 5A. Specifically, in the present embodiment, step phases one step before and after each of step phases 4, 12, 20, and 28 are set as the second phase region. The present embodiment is, however, not limited to this setting, but may set (change) the second phase region according to specific characteristics of the stepping motor 111-a as appropriate.

Figure 5C:
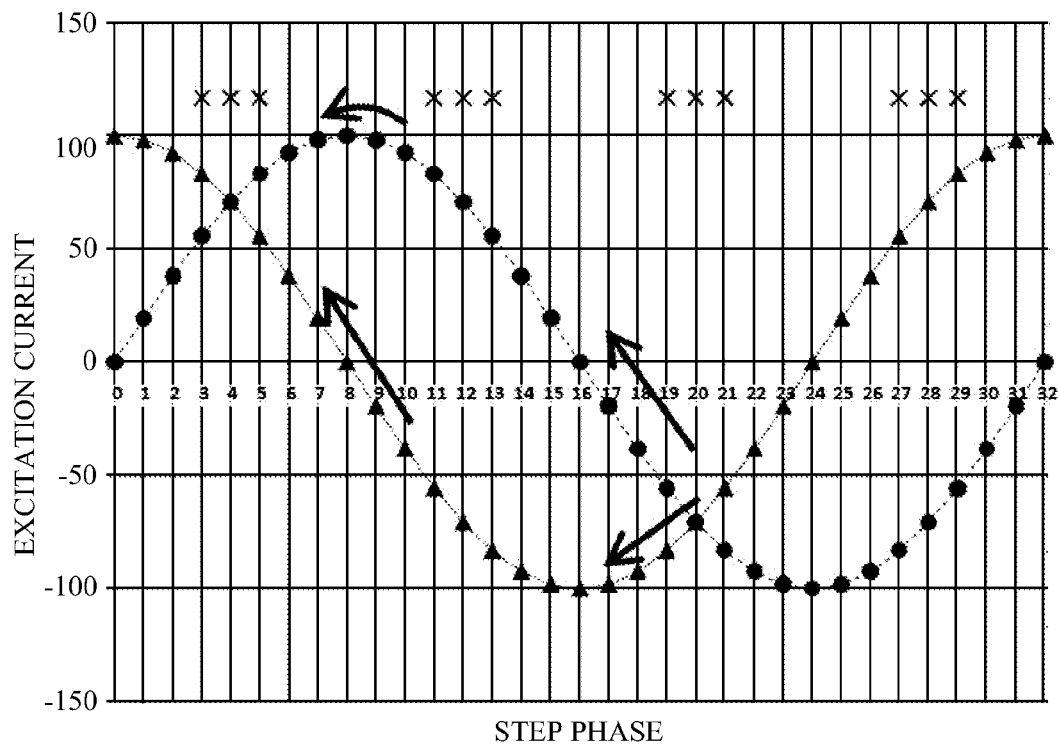
FIG. 5C is a diagram illustrating a drive control of the stepping motor when the first embodiment is not applied.
Figure 5D:
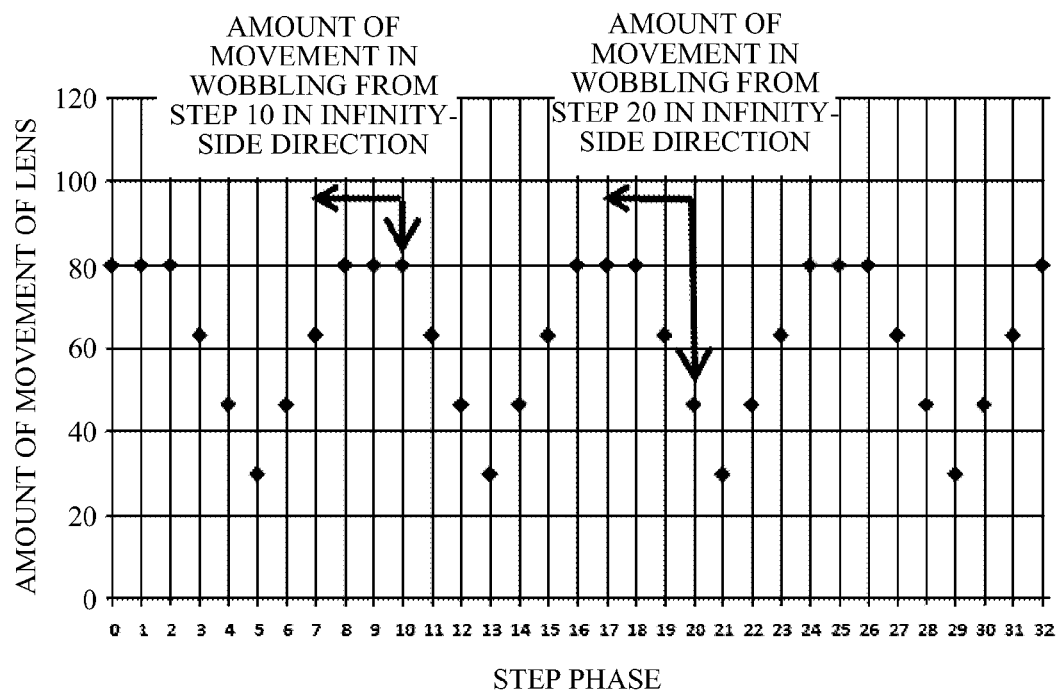
FIG. 5D is a diagram illustrating the drive control of the stepping motor when the first embodiment is not applied.

FIG. 5C and FIG. 5D illustrate, the excitation current (excitation current waveform) when a lens position control is performed to move the lens in the direction from the closest side to the infinity side, and the amount of movement of the lens in the wobbling operation, respectively. FIG. 5C and FIG. 5D illustrate the case of driving in three steps (with three step widths) from step phase 19 in the infinity-side direction and the case of driving in three steps (with three step widths) from step phase 20 in the infinity-side direction. Similarly to the excitation operation in the direction from the infinity side to the closest-side described with reference to FIG. 5A and FIG. 5B, it is observed that fluctuation in the rotation angle (difference in the amount of movement of the lens) is generated due to the cogging. Specifically, the amount of movement of the lens is substantially in a range of 65 to 80% in the case of performing the three step drive from step phase 10 in the infinity-side direction, whereas the amount of movement of the lens is substantially in a range of 45 to 80% in the case of performing the three step drive from step phase 20 in the infinity-side direction.

Next, referring to FIG. 1, the excitation waveform generation processing (steps S310 and S316 in FIG. 4) in the present embodiment will be described in detail. FIG. 1 is a flowchart of the excitation waveform generation processing. The steps in FIG. 1 are each performed based on a command from the camera microcomputer 118.

First, at step S501, the camera microcomputer 118 performs comparison to determine whether a predetermined flag is included within the phase range of a drive excitation phase (the range of the micro-step drive) of driving with the drive amplitude command (with the first drive amount) set in a previous step (compares the drive excitation phase and the flag). Then, at step S502, the camera microcomputer 118 determines whether the flag is included within the phase range of the drive excitation phase. When the flag is not included (the flag is "Low"), the camera microcomputer 118 performs a drive control of the focusing drive unit 111 (the stepping motor 111-a) with drive conditions set in the previous step. Specifically, the camera microcomputer 118 performs a drive control of the stepping motor with the first drive amount (the first drive pulse or the first number of drive pulses). On the other hand, when the flag is included within the phase range of the drive excitation phase (the flag is "Hi"), the flow proceeds to step S503.

At step S503, the camera microcomputer 118 counts the number of flags within the phase range of the drive excitation phase and acquires the number of counts. Then, at step S504, the camera microcomputer 118 acquires a first value by subtracting the number of counts acquired at step S503 from the number of drive pulses (the first number of drive pulses as the first drive amount). Then, the camera microcomputer 118 sets a second value obtained by adding the first value to the number of drive pulses (the first number of drive pulses), as a new number of drive pulses (a second number of drive pulses as a second drive amount). Specifically, the camera microcomputer 118 performs the calculation of "the number of drive pulses+(the number of drive pulses−the number of counts) =the new number of drive pulses". Then, the camera microcomputer 118 performs a drive control using the second drive pulse acquired at step S504, that is, the second number of drive pulses (the new number of drive pulses).

Subsequently, referring to FIG. 1, FIG. 5A to FIG. 5D, and FIGS. 6A and 6B, a more specific drive control method will be described. FIG. 5A and FIG. 5B illustrate the excitation current waveform in driving in the direction from the infinity side to the closest side, and the range of movement of the lens (the amount of movement of the lens) in the wobbling operation, respectively, when the present embodiment is not applied. FIG. 5C and FIG. 5D illustrate the excitation current waveform in driving in the direction from the closest side to the infinity side, and the range of movement of the lens (the amount of movement of the lens) in the wobbling operation, when the present embodiment is not applied.

The excitation phases (step phases) with "x" in FIG. 5A are, as described above, the excitation phases included in the phase range stored as the second phase region in the camera microcomputer 118, and indicate phases with flags. For example, at step S308 in FIG. 4, when three step drive excitation is specified from step 7 in FIG. 5A in the closest-side direction, no flag ("x") exists from step 7 to step 10 in FIG. 5A, compared to the flags stored in the camera microcomputer 118. The camera microcomputer 118 thus determines that the flag is "Low" (No) at step S502 in FIG. 1, and generates the three step drive excitation waveform from step 7 to step 10 specified at step S308 in FIG. 4.

On the other hand, when the three step drive excitation is specified from step 17 in FIG. 5A in the closest-side direction at step S308 in FIG. 4, flags exist from step 17 to step 20 (steps 19 and 20), compared to the flags stored in the camera microcomputer 118. The camera microcomputer 118 thus determines that the flag is "Hi" (Yes) at step S502 in FIG. 1, and the flow proceeds to step S503 in FIG. 1. At step S503, the camera microcomputer 118 counts the number of flags within the specified drive excitation range. In this case, two flags exist from step 17 to step 20 in FIG. 5A, and the number of counts is two. Then, at step S504 in FIG. 1, the equation of "the number of drive pulses (three)+(the number of drive pulses (three)−the number of counts (two))=the new number of drive pulses (four)" is satisfied, and the camera microcomputer 118 generates four pulses from step 17 to step 21 as a new drive excitation command.

Figure 6A:
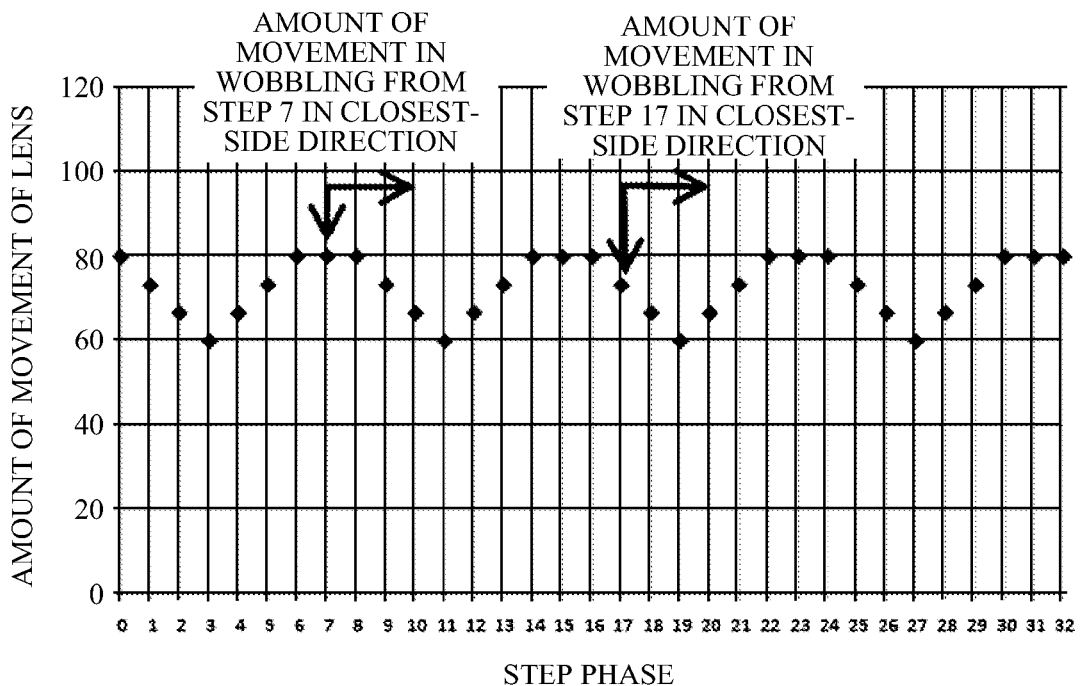
FIG. 6A is a diagram illustrating a drive control of the stepping motor when the first embodiment is applied.
Figure 6B:
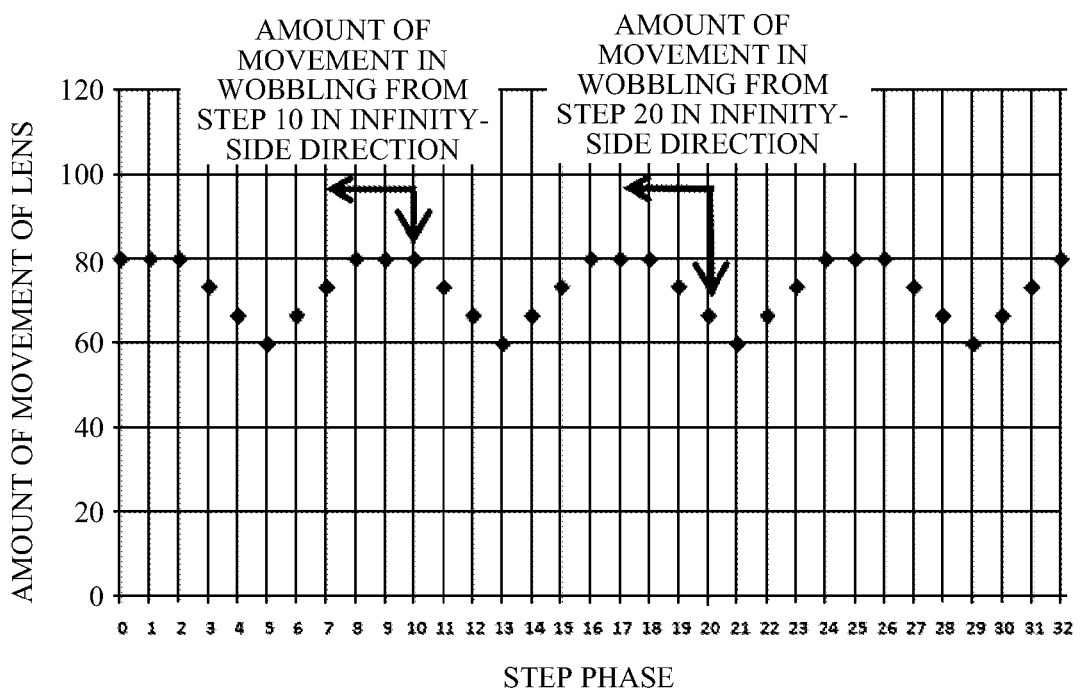
FIG. 6B is a diagram illustrating the drive control of the stepping motor when the first embodiment is applied.

FIG. 6A illustrates the range of movement of the lens (the amount of movement of the lens) in the direction from the infinity side to the closest side in wobbling by the above described correcting operation (the drive control method of the present embodiment). As compared to FIG. 5B, the range of movement of the lens illustrated in FIG. 6A shows that variation in the range of movement is markedly reduced at each excitation phase (at each step phase) of the range of movement of the lens. FIG. 5D and FIG. 6B each illustrate the range of movement of the lens when a lens position control is performed to move the lens in the direction from the closest side to the infinity side in the wobbling operation. As compared to FIG. 5D where the present embodiment is not applied, FIG. 6B where the present embodiment is applied shows that variation in the range of movement is markedly reduced at each excitation phase (at each step phase) of the range of movement of the lens.

As described above, in the present embodiment, the camera microcomputer 118 (control unit) calculates the first drive pulse (the first number of drive pulses) of the focusing drive unit 111 (the stepping motor 111-a) to perform the micro-step drive. Then, when performing the micro-step drive with the first drive pulse (the first number of drive pulses) in the wobbling operation, the camera microcomputer 118 changes the first drive pulse (the first number of drive pulses) to the second drive pulse (the second number of drive pulses). This change is performed depending on the ratio of the step phase (excitation phase) of a predetermined phase region included in the range of the micro-step drive.

The camera microcomputer 118 preferably changes the first drive amount (the first drive pulse) to the second drive amount (the second drive pulse) when the step phase of the predetermined phase region is included during performing the micro-step drive with the first drive amount. The camera microcomputer 118 more preferably changes the second drive amount depending on the ratio of the step phase of the predetermined phase region included during performing the micro-step drive with the first drive amount. That is, the camera microcomputer 118 changes the first drive amount to the second drive amount to reduce an error in the rotation angle of the stepping motor 111-a attributable to the cogging.

The predetermined phase region is preferably a phase region (the second phase region) where the excitation current exceeds a predetermined value in both phases (the two phases). For example, in the present embodiment, as illustrated in FIG. 5A and FIG. 5C, the predetermined phase region is a phase region where the excitation current exceeds 50% of the amplitude in both phases (a phase region where the absolute value of the excitation current exceeds 50).

The camera microcomputer 118 preferably calculates the number of the step phases included in the predetermined phase region (the second phase region) during performing the micro-step drive with the first number of drive pulses (step S503). The camera microcomputer 118 then calculates the second number of drive pulses by adding, to the first number of drive pulses, a value obtained by subtracting the number of step phases included in the predetermined phase region from the first number of drive pulses (step S504).

As described above, for the drive excitation command values for wobbling calculated at steps S308, S309, S314, and S315, it is possible to easily correct an error in the rotation angle attributable to the cogging. In an automatic blanket function widely adopted in image pickup apparatuses such as a video camera and a digital camera, a fine adjustment of the opening (F number) of an aperture stop is continuously performed. The application of the drive control of the present embodiment allows a fine exposure correction to be effectively performed. In an automatic zoom function to keep constant the angle of view with respect to an object, a fine zoom adjustment is continuously performed using a zoom lens. The application of the drive control of the present embodiment allows a highly accurate automatic zoom.

[Second Embodiment]

Figure 7:
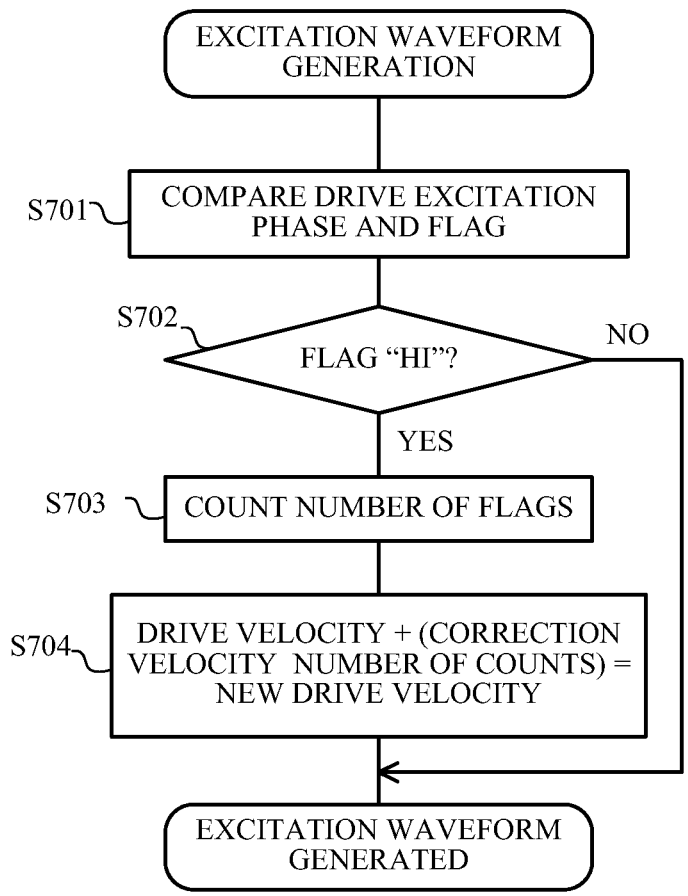
FIG. 7 is a flowchart of excitation waveform generation processing in a second embodiment.

Next, referring to FIG. 7, excitation waveform generation processing in a second embodiment of the present invention will be described. FIG. 7 is a flowchart of the excitation waveform generation processing. The steps in FIG. 7 are each performed based on a command from the camera microcomputer 118.

The present embodiment differs from the first embodiment in that it changes the rotational velocity (drive velocity) of the stepping motor depending on the step phase in the wobbling operation whereas the first embodiment changes the number of micro steps (a drive pulse or the number of drive pulses (drive amount)) depending on the step phase in the wobbling operation.

First, at step S701, the camera microcomputer 118 compares an excitation phase range of driving with the drive amplitude (the number of micro steps) determined at steps S308, S309, S314, and S315 in FIG. 4, with a flag previously stored in the camera microcomputer 118. Subsequently, when determining that no flag exists at step S702, the camera microcomputer 118 generates an excitation waveform. On the other hand, when determining that a flag exists at step S702, the flow proceeds to step S703 and the camera microcomputer 118 counts the number of flags acquired at steps S701 and S702.

Subsequently, at step S704, the camera microcomputer 118 multiplies a predetermined correction velocity by the number of counts (the number of flags) acquired at step S703, and sets a value obtained by adding the drive velocity (a first drive velocity) to the multiplied value, as a new drive velocity (a second drive velocity). Specifically, the camera microcomputer 118 performs the calculation of "the drive velocity+(the correction velocity×the number of counts)=the new drive velocity". The correction velocity is set as appropriate according to purposes. That is, the camera microcomputer 118 (control unit) calculates the number of step phases included in a predetermined phase region (the second phase region) during performing the micro-step drive at the first drive velocity. The camera microcomputer 118 then calculates the second drive velocity by adding, to the first drive velocity, the value obtained by multiplying the predetermined correction velocity by the number of step phases included in the predetermined phase region.

In the present embodiment, the drive control of the stepping motor is performed at the second drive velocity, so that the control is performed at a high speed in a phase region where the rotation angle decreases due to the cogging, thereby allowing correction of the rotation angle by an inertial force.

[Other Embodiments]

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment (s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

The embodiments each provide a drive controller, an image pickup apparatus, a drive control method, and a non-transitory computer-readable storage medium that reduce adverse effects attributable to fluctuation in the rotation angle of the micro step of the stepping motor according to the step phase.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the drive controller of each of the embodiments performs the micro-step drive using the two-phase excitation current, but may be configured to perform the micro-step drive using a 1-2 phase excitation current or three or more phase excitation current.

This application claims the benefit of Japanese Patent Application No. 2013-105929, filed May 20, 2013, which is hereby incorporated by reference herein in its entirety.

What is claimed is:

1. A drive controller comprising:
   a stepping motor capable of performing micro-step drive of a predetermined number of divisions by using an excitation current having a sine waveform; and
   a control unit configured to calculate a first drive pulse of the stepping motor to perform the micro-step drive,
   wherein the control unit is configured to:
      determine whether a step phase within a predetermined phase region of the excitation current is included in a range of the micro-step drive if the micro-step drive is to be performed with the first drive pulse in a wobbling operation,
      perform the micro-step drive with the first drive pulse when the step phase within the predetermined phase region is not included in the range of the micro-step drive,
      perform the micro-step drive with a second drive pulse when the step phase within the predetermined phase region is included in the range of the micro-step drive,
      determine a number of the step phases included in the range of the micro-step drive, and
      derive the second drive pulse which changes according to the number of the step phases.

2. The drive controller according to claim 1, wherein:
   the excitation current is an excitation current having two phases different from each other, and
   the predetermined phase region is a phase region in which the excitation current exceeds a predetermined value in the two phases.

3. The drive controller according to claim 2, wherein the predetermined phase region is a phase region in which the excitation current exceeds 50% of an amplitude in the two phases.

4. The drive controller according to claim 1, wherein the first drive pulse and the second drive pulse are a first number of drive pulses and a second number of drive pulses of the stepping motor, respectively.

5. The drive controller according to claim 4,
wherein the control unit is configured to determine the second number of drive pulses by adding, to the first number of drive pulses, a value obtained by subtracting the number of the step phases within the predetermined phase region from the first number of drive pulses.

6. A drive controller comprising:
a stepping motor capable of performing micro-step drive of a predetermined number of divisions by using an excitation current having a sine waveform; and
a control unit configured to calculate a first drive velocity of the stepping motor to perform the micro-step drive,
wherein the control unit is configured to:
    determine whether a step phase within a predetermined phase region of the excitation current is included in a range of the micro-step drive if the micro-step drive is to be performed with the first drive velocity in a wobbling operation,
    perform the micro-step drive with the first drive velocity when the step phase within the predetermined phase region is not included in the range of the micro-step drive,
    perform the micro-step drive with a second drive velocity when the step phase within the predetermined phase region is included in the range of the micro-step drive,
    determine the number of the step phases included in the range of the micro-step drive, and
    derive the second drive velocity which changes according to the number of the step phases.

7. The drive controller according to claim 6,
wherein the control unit is configured to determine the second drive velocity by adding, to the first drive velocity, a value obtained by multiplying a predetermined correction velocity by the number of the step phases within the predetermined phase region.

8. The drive controller according to claim 1, further comprising a storage unit configured to store the predetermined phase region.

9. The drive controller according to claim 1, further comprising a transmission mechanism configured to transfer energy generated through drive of the stepping motor to a lens to move the lens.

10. The drive controller according to claim 1, wherein the control unit is configured to change the first drive pulse to the second drive pulse to reduce an error in an rotation angle of the stepping motor attributable to cogging.

11. An image pickup apparatus comprising:
a lens;
a drive controller; and
a focus control unit configured to perform automatic focus by moving the lens by the drive controller,
wherein the drive controller includes:
    a stepping motor capable of performing micro-step drive of a predetermined number of divisions by using an excitation current having a sine waveform; and
    a control unit configured to calculate a first drive pulse of the stepping motor to perform the micro-step drive, and
wherein the control unit is configured to:
    determine whether a step phase within a predetermined phase region of the excitation current is included in a range of the micro-step drive if the micro-step drive is to be performed with the first drive pulse in a wobbling operation,
    perform the micro-step drive with the first drive pulse when the step phase within the predetermined phase region is not included in the range of the micro-step drive,
    perform the micro-step drive with a second drive pulse when the step phase within the predetermined phase region is included in the range of the micro-step drive,
    determine a number of the step phases included in the range of the micro-step drive, and
    derive the second drive pulse which changes according to the number of the step phases.

12. The image pickup apparatus according to claim 11, wherein the focus control unit is configured to perform the wobbling operation by a TV-AF method.

13. A method of performing a drive control of a stepping motor capable of performing micro-step drive of a predetermined number of divisions by using an excitation current having a sine waveform, the method comprising the steps of:
calculating a first drive pulse of the stepping motor to perform the micro-step drive;
determining whether a step phase within a predetermined phase region of the excitation current is included in a range of the micro-step drive if the micro-step drive is to be performed with the first drive pulse in a wobbling operation;
performing the micro-step drive with the first drive pulse when the step phase within the predetermined phase region is not included in the range of the micro-step drive; and
performing the micro-step drive with a second drive pulse when the step phase within the predetermined phase region is included in the range of the micro-step drive,
wherein the step of performing the micro-step drive with the second drive pulse includes:
    determining a number of the step phases included in the range of the micro-step drive, and
    deriving the second drive pulse which changes according to the number of the step phases.

14. The method according to claim 13, wherein:
the excitation current is an excitation current having two phases different from each other, and
the predetermined phase region is a phase region in which the excitation current exceeds a predetermined value in the two phases.

15. A method of performing a drive control of a stepping motor capable of performing micro-step drive of a predetermined number of divisions by using an excitation current having a sine waveform, the method comprising the steps of:
calculating a first drive velocity of the stepping motor to perform the micro-step drive;
determining whether a step phase within a predetermined phase region of the excitation current is included in a range of the micro-step drive if the micro-step drive is to be performed at the first drive velocity in a wobbling operation; and
performing the micro-step drive with the first drive velocity when the step phase within the predetermined phase region is not included in the range of the micro-step drive; and performing the micro-step drive with a second drive velocity when the step phase within the predetermined phase region is included in the range of the micro-step drive, wherein the step of performing the micro-step drive with the second drive velocity includes:
  determining a number of the step phases included in the range of the micro-step drive, and
  deriving the second drive velocity which changes according to the number of the step phases.

16. The method according to claim 15, wherein:
the excitation current is an excitation current having two phases different from each other, and
the predetermined phase region is a phase region in which the excitation current exceeds a predetermined value in the two phases.

17. A non-transitory computer-readable storage medium that stores a program configured to cause a computer to execute a process of a drive control of a stepping motor capable of performing micro-step drive of a predetermined number of divisions by using an excitation current having a sine waveform, the process comprising:
  calculating a first drive pulse of the stepping motor to perform the micro-step drive;
  determining whether a step phase within a predetermined phase region of the excitation current is included in a range of the micro-step drive if the micro-step drive is to be performed with the first drive pulse in a wobbling operation;
  performing the micro-step drive with the first drive pulse when the step phase within the predetermined phase region is not included in the range of the micro-step drive; and
  performing the micro-step drive with a second drive pulse when the step phase within the predetermined phase region is included in the range of the micro-step drive,
wherein the step of performing the micro-step drive with the second drive pulse includes:
  determining a number of the step phases included in the range of the micro-step drive, and
  deriving the second drive pulse which changes according to the number of the step phases.

18. A non-transitory computer-readable storage medium that stores a program configured to cause a computer to execute a process of a drive control of a stepping motor capable of performing micro-step drive of a predetermined number of divisions by using an excitation current having a sine waveform, the process comprising:
  calculating a first drive velocity of the stepping motor to perform the micro-step drive;
  determining whether a step phase within a predetermined phase region of the excitation current is included in a range of the micro-step drive if the micro-step drive is to be performed at the first drive velocity in a wobbling operation; and
  performing the micro-step drive with the first drive velocity when the step phase within the predetermined phase region is not included in the range of the micro-step drive; and
  performing the micro-step drive with a second drive velocity when the step phase within the predetermined phase region is included in the range of the micro-step drive,
wherein the step of performing the micro-step drive with the second drive velocity includes:
  determining a number of the step phases included in the range of the micro-step drive, and
  deriving the second drive velocity which changes according to the number of the step phases.

* * * * *